United States Patent
Shin et al.

(10) Patent No.: US 9,746,642 B2
(45) Date of Patent: Aug. 29, 2017

(54) PHOTOGRAPHING LENSES AND PHOTOGRAPHING APPARATUS

(71) Applicant: Samsung Electronics Co., Ltd., Gyeonggi-do (KR)

(72) Inventors: Jeong-kil Shin, Gyeonggi-do (KR); Jin-seon Seo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/883,998

(22) Filed: Oct. 15, 2015

(65) Prior Publication Data

US 2016/0109689 A1   Apr. 21, 2016

(30) Foreign Application Priority Data

Oct. 20, 2014   (KR) ........................ 10-2014-0141696

(51) Int. Cl.
| | |
|---|---|
| G02B 13/18 | (2006.01) |
| G02B 3/02 | (2006.01) |
| G02B 9/60 | (2006.01) |
| G02B 13/00 | (2006.01) |

(52) U.S. Cl.
CPC ............ G02B 13/0045 (2013.01); G02B 9/60 (2013.01)

(58) Field of Classification Search
CPC .............................. G02B 9/60; G02B 13/0045
USPC ................... 359/714, 753, 763, 764
See application file for complete search history.

(56) References Cited

U.S. PATENT DOCUMENTS

| | | | |
|---|---|---|---|
| 7,502,181 | B2 | 3/2009 | Shinohara |
| 7,911,711 | B1 | 3/2011 | Tang et al. |
| 8,000,031 | B1 | 8/2011 | Tsai |
| 8,488,259 | B2 | 7/2013 | Chen et al. |
| 8,670,191 | B2 | 3/2014 | Chen |
| 9,235,028 | B2 | 1/2016 | Yoneyama et al. |
| 2014/0049839 | A1 | 2/2014 | Shinohara |
| 2014/0153115 | A1 | 6/2014 | Hagiwara |
| 2016/0161714 | A1* | 6/2016 | Lee .................... G02B 13/0045 348/335 |

FOREIGN PATENT DOCUMENTS

| | | |
|---|---|---|
| CN | 103941376 A | 7/2014 |
| JP | 2007-264180 A | 10/2007 |
| JP | 2008-215162 A | 9/2008 |
| JP | 2014-197103 A | 10/2014 |

OTHER PUBLICATIONS

Chinese Search Report dated Jun. 27, 2017.

* cited by examiner

*Primary Examiner* — William Choi
(74) *Attorney, Agent, or Firm* — Cha & Reiter, LLC

(57) ABSTRACT

A photographing lenses and a photographing apparatus including the photographing lenses. The photographing lenses include: a first lens having a positive refractive power and a convex object-side surface; a second lens having a negative refractive power and a flat surface facing an object side or an image side; a third lens having a refractive power; a fourth lens having a negative refractive power and a meniscus shape concave toward the object side; and a fifth lens which is concave toward the image side in a region around an optical axis of the photographing lenses, wherein the first to fifth lenses are sequentially arranged in a direction from the object side to the image side.

8 Claims, 15 Drawing Sheets

PHOTOGRAPHING LENSES AND PHOTOGRAPHING APPARATUS

CLAIM OF PRIORITY

This application claims the benefit of priority from Korean Patent Application No. 10-2014-0141696, filed on Oct. 20, 2014, in the Korean Intellectual Property Office, the disclosure of which is incorporated by reference herein in its entirety.

BACKGROUND

1. Field of the Disclosure

The present disclosure relates to the method for manufacturing and the structure of lenses used for photography that are relatively small and easy to manufacture. The present disclosure also relates to a photographing apparatus (i.e. camera or camera module) that includes the photographing lenses.

2. Description of the Related Art

Many photographing apparatuses use solid-state photographing devices such as, for example, charge-coupled device (CCD) image sensors and complementary metal-oxide semiconductor (CMOS) image sensors. Examples of such photographing apparatuses include digital still cameras, video cameras, and cameras of all types having interchangeable lenses. As photographing apparatuses that employ solid-state imaging devices are more easily manufactured to have smaller sizes, the recent manufacture of handheld terminals such as cellular phones are equipped with such photographing apparatuses. Customers continue to demand increasingly higher-performance devices that include more and more advanced features such as high-resolution, wide-angle devices. In addition, an increasing number of customers have expert knowledge about cameras so the advanced features are more-appreciated now than ever.

Small and high-pixel photographing apparatuses require high-resolution and high-performance photographing lenses because of their compact size. However, it is very difficult to manufacture high-performance photographing apparatuses having a compact design and by only using four or five lenses and incorporating such high-performance photographing apparatuses (typically in the form of a camera hardware module) into slim portable terminals while maintaining optical characteristics and aberration characteristics of the larger-sized high-performance photographing apparatuses.

SUMMARY

The present disclosure provides an arrangement of photographing lenses that are relatively small and easy to manufacture.

The present disclosure also provides a photographing apparatus (i.e. camera or camera hardware module) including small and easy-to-manufacture photographing lenses.

Additional aspects will be set forth in part in the description which follows and, in part, will be apparent from the description, or may be learned by a person of ordinary skill in the art through practice of the presented embodiments.

According to an aspect of the disclosure, the photographing lenses may include: a first lens having a positive refractive power and a convex object-side surface; a second lens having a negative refractive power and a flat surface facing an object side or an image side; a third lens having a refractive power; a fourth lens having a negative refractive power and a meniscus shape that is concave toward the object side; and a fifth lens which is concave toward the image side in a region around an optical axis of the photographing lenses, wherein the first to fifth lenses are sequentially arranged in a direction from the object side to the image side, and the photographing lenses may satisfy the following formulas:

$$V1-V2>25$$

$$F4/F<-2 \qquad \text{<Formulas>}$$

wherein V1 denotes an Abbe number of the first lens, V2 denotes an Abbe number of the second lens, F denotes a focal length of the photographing lenses, and F4 denotes a focal length of the fourth lens. An artisan well understands that the Abbe number (V-number) can be defined as a measure of a transparent material's dispersion, i.e. a variation of the refractive index with respect to wavelength. High V values indicate low dispersion.

According to an aspect of the disclosure, the photographing lenses may satisfy the following formula:

$$-3<F2/F1<-1 \qquad \text{<Formula>}$$

wherein F1 denotes a focal length of the first lens, and F2 denotes a focal length of the second lens.

According to an aspect of the disclosure the photographing lenses satisfy the following formula:

$$-2<F2/F<-0.8 \qquad \text{<Formula>}$$

wherein F denotes the focal length of the photographing lenses, and F2 denotes a focal length of the second lens.

According to another aspect of the disclosure, the photographing lenses may further include an aperture stop between the object side and the first lens or between the first lens and the second lens.

According to still another aspect of the disclosure, each of the first to fifth lenses may be a plastic lens.

According to yet another aspect of the disclosure, at least one of the first to fifth lenses may be an aspheric lens.

In still another aspect of the disclosure, each of the first to fifth lenses may be an aspheric lens.

According to an embodiment of the disclosure, a photographing lenses may include: a first lens having a positive refractive power and a convex object-side surface; a second lens having a negative refractive power and a flat surface facing an object side or an image side; a third lens having a positive refractive power; a fourth lens having a negative refractive power and a meniscus shape concave toward the object side; and a fifth lens which is concave toward the image side in a region around an optical axis of the photographing lenses, wherein the first to fifth lenses are sequentially arranged in a direction from the object side to the image side, and the photographing lenses satisfy the following formulas:

$$V1-V2>25$$

$$F5/F<-1.5 \qquad \text{<Formula>}$$

wherein F denotes a focal length of the photographing lenses, F5 denotes a focal length of the fifth lens, V1 denotes an Abbe number of the first lens 1, and V2 denotes an Abbe number of the second lens.

According to another embodiment of the disclosure, a photographing lenses may include: a first lens having a positive refractive power; a second lens having a negative refractive power and a concave image-side surface; a third lens having a positive refractive power and a meniscus shape convex toward an image side; a fourth lens having a negative refractive power and a meniscus shape concave toward an object side; and a fifth lens having a negative refractive power and an inflection point on at least one of an object-side surface and an image-side surface of the fifth lens, wherein the first to fifth lenses are sequentially arranged in a direction from the object side to the image side, and the photographing lenses satisfy the following formulas:

$-0.5 < R1/R2 < -0.15$ $0.8 < F/R4 < 1.7$ <Formula> wherein R1 denotes a radius of curvature of an object-side surface of the first lens, R2 denotes a radius of curvature of an image-side surface of the first lens, F denotes a focal length of the photographing lenses, and R4 denotes a radius of curvature of the image-side surface of the second lens.

BRIEF DESCRIPTION OF THE DRAWINGS

The above and/or other aspects of the present disclosure will become better understood by a person of ordinary skill in the art and more readily appreciated from the following description of the various embodiments herein, taken in conjunction with the accompanying drawings in which.

DETAILED DESCRIPTION

Figure 1:
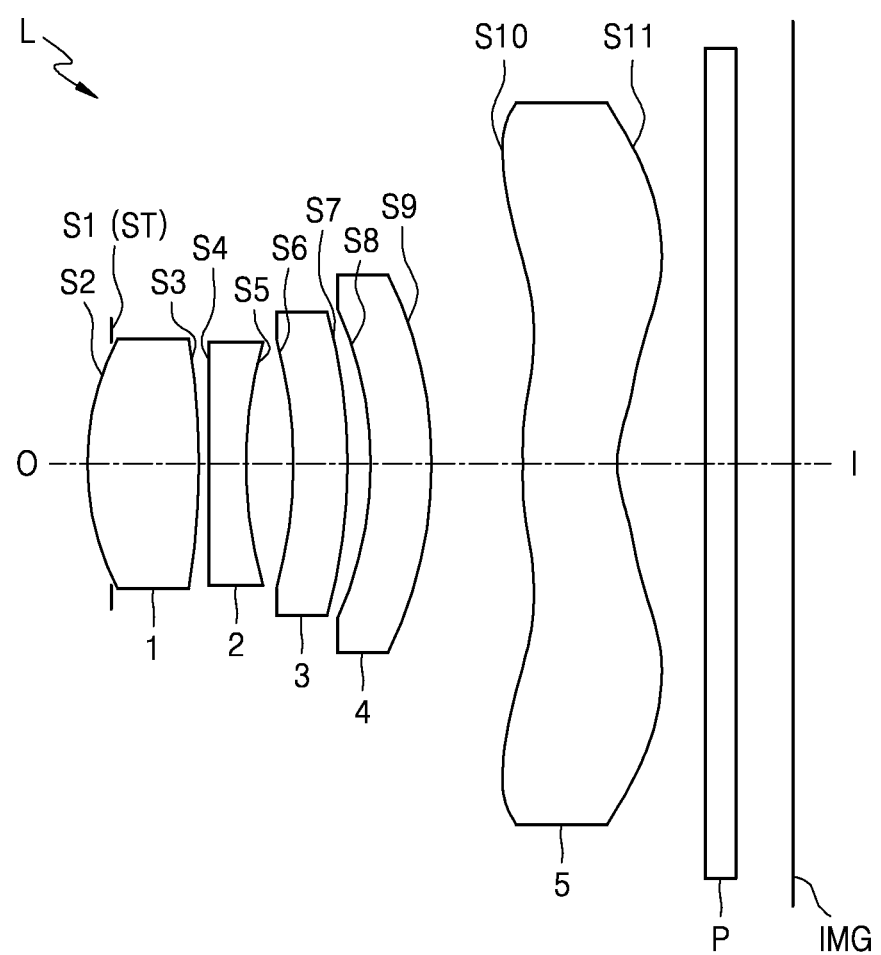
FIG. 1 illustrates an arrangement of photographing lenses according to a first embodiment of the present disclosure.

Reference will now be made in more detail to embodiments of the present disclosure, examples of which are illustrated in the accompanying drawings, wherein like reference numerals refer to like elements throughout. In this regard, the present embodiments may have different forms and the appended claims are not to be construed as being limited to the descriptions set forth herein. Accordingly, the exemplary embodiments are merely described below, by referring to the figures, to illustrate certain aspects of the inventive concept. As used herein, the term "and/or" includes any and all combinations of one or more of the associated listed items. Expressions such as "at least one of," when preceding a list of elements, modify the entire list of elements and do not modify the individual elements of the list.

Photographing lenses and a photographing apparatus including the photographing lenses will now be described according to embodiments of the disclosure with reference to the accompanying drawings.

FIG. 1 illustrates photographing lenses L according to an embodiment of the disclosure.

Referring now to FIG. 1, the photographing lenses L may include a first lens 1 having a positive refractive power, a second lens 2 having a negative refractive power, a third lens 3 having a predetermined degree of refractive power, a fourth lens 4 having a negative refractive power, and a fifth lens 5 having a negative refractive power, and the first to fifth lenses 1 to 5 may be sequentially arranged in a direction from an object side O to an image side I.

For example, the first lens 1 may have a convex object-side surface. The first lens 1 may be a double convex lens. One of an object-side surface and an image-side surface of the second lens 2 may be flat, as shown in FIG. 1. For example, the second lens 2 may have a flat object-side surface and a concave image-side surface. If the second lens 2 has a flat surface on one side thereof, the second lens 2 may be easily manufactured even though the thickness of the second lens 2 is small at the center of the second lens 2.

An aperture stop ST may be disposed at a predetermined position between the object side O and the second lens 2. For example, the aperture stop ST may be disposed between the object side O and the first lens 1. In another example, the aperture stop ST may be disposed between the first lens 1 and the second lens 2. Since a diameter through which light passes is adjustable using the aperture stop ST, the photographing lenses L may be manufactured to have a small size.

For example, the third lens 3 may have a meniscus shape concave toward the object side O. The third lens 3 may have a positive refractive power or a negative refractive power.

The fourth lens 4 may have a meniscus shape concave toward the object side O. For example, the fourth lens 4 may have a negative refractive power. The fourth lens 5 may have a concave shape toward the image side I in a region around the optical axis of the photographing lenses L. At least one of an object-side surface S10 and an image-side surface S11 of the fifth lens 5 may have at least one inflection point. Herein, the term "inflection point" may refer to a point at which the sign of the radius of curvature of a lens surface changes from positive (+) to negative (−), or from negative (−) to positive (+). In addition, the term "reflection point" may refer to a point at which the shape of a lens surface changes from convex to concave, or from concave to convex. For example, the image-side surface S11 of the fifth lens 5 may be concave in a region around the optical axis of the photographing lenses L and convex in a direction away from the optical axis. The object-side surface S10 of the fifth lens 5 may be convex toward the object side O in a region around the optical axis and may become concave in a direction away from the optical axis.

An object image may pass through the first lens 1, the second lens 2, the third lens 3, the fourth lens 4, and the fifth lens 5, and may then be incident on an image plane "IMG". For example, the image plane IMG may be a surface of an imaging device or an image sensor.

At least one optical filter "P" may optionally be disposed between the fifth lens 5 and the image plane IMG or between the fifth lens 5 and an image sensor. The optical filter P may include at least one of low-pass filters, infrared (IR)-cut filters, and cover glass. If the optical filter P includes an IR-cut filter, visible light may pass through the optical filter P but infrared rays may not pass through the optical filter P. Thus, infrared rays may not reach the image plane IMG. However, the photographing lenses L may not include an optical filter.

The first to fifth lenses 1 to 5 may include at least one aspheric lens. Each of the first to fifth lenses 1 to 5 may have at least one aspheric surface. For example, each of the first to fifth lenses 1 to 5 may be a double aspheric lens. In this case, the photographing lenses L may have a compact shape and high-resolution characteristics.

At least one of the first to fifth lenses 1 to 5 may be a plastic lens. For example, each of the first to fifth lenses 1 to 5 may be a plastic lens. If at least one of the first to fifth lenses 1 to 5 is formed of a plastic material, the photographing lenses L may be manufactured at low cost, and an aspheric surface may be easily formed on a plastic material.

In the embodiment, the photographing lenses L may satisfy the following Formulas 1 and 2:

$$V1-V2>25 \qquad \qquad \text{<Formula 1>}$$

$$F4/F<-2 \qquad \qquad \text{<Formula 2>}$$

In Formulas 1 and 2, V1 denotes the Abbe number of the first lens 1, V2 denotes the Abbe number of the second lens 2, F denotes the focal length of the photographing lenses L, and F4 denotes the focal length of the fourth lens 4.

Formula 1 describes a relationship between the Abbe number of the first lens 1 and the Abbe number of the second lens 2. When (V1 −V2) satisfies Formula 1, chromatic aberration may be properly corrected, and the photographing lenses L may be less sensitively affected by manufacturing conditions or environments.

Formula 2 describes a relationship between the focal length of the fourth lens 4 and the focal length of all the photographing lenses L. If (F4/F) is equal to or greater than the upper limit in Formula 2, the refractive power of the first lens 1 or the third lens 3 may have to be increased as the refractive power of the fourth lens 4 is decreased. In this case, the photographing lenses L may be more sensitively affected by manufacturing conditions or environments, and it may be difficult to manufacture the photographing lenses L to have a slim shape.

In the embodiment, the photographing lenses L may satisfy the following Formulas 3 and 4:

$$-3<F2/F1<-1 \qquad \qquad \text{<Formula 3>}$$

$$-2<F2/F<-0.8 \qquad \qquad \text{<Formula 4>}$$

In Formulas 3 and 4, F1 denotes the focal length of the first lens 1, and F2 denotes the focal length of the second lens 2.

Formula 3 describes the ratio of the focal length of the second lens 2 to the focal length of the first lens 1. If (F2/F1) is equal to or greater than the upper limit in Formula 3, it may be difficult to manufacture the photographing lenses L to have a slim shape, and if (F2/F1) is equal to or less than the lower limit in Formula 3, it may be difficult to correct the chromatic aberration of the photographing lenses L.

Formula 4 describes the ratio of the focal length of the second lens 2 to the focal length of the photographing lenses L. If (F2/F) is equal to or greater than the upper limit in Formula 4, the photographing lenses L may be more sensitively affected by manufacturing conditions or environments, and if (F2/F) is equal to or lower than the lower limit in Formula 4, it may be difficult to correct the chromatic aberration of the photographing lenses L.

In the embodiment, the photographing lenses L may satisfy the following Formula 5:

$$F5/F<-1.5 \qquad \qquad \text{<Formula 5>}$$

In Formula 5, F denotes the focal length of the photographing lenses L, and F5 denotes the focal length of the fifth lens 5.

Formula 5 describes a relationship between the focal length of the fifth lens 5 and the focal length of the photographing lenses L. If (F5/F) is equal to or greater than the upper limit in Formula 5, the negative refractive power of the fifth lens 5 increases, and thus it may be difficult to manufacture the photographing lenses L to have a thin shape.

In the embodiment, the photographing lenses L may satisfy the following Formulas 6 and 7:

$$-0.5<R1/R2<-0.15 \qquad \qquad \text{<Formula 6>}$$

$$0.8<F/R4<1.7 \qquad \qquad \text{<Formula 7>}$$

In Formulas 6 and 7, R1 denotes the radius of curvature of the object-side surface of the first lens 1, R2 denotes the radius of curvature of the image-side surface of the first lens 1, F denotes the focal length of the photographing lenses L, and R4 denotes the radius of curvature of the image-side surface of the second lens 2.

Formula 6 describes a relationship the relationship between the radii of curvature of the object-side surface and the image-side surface of the first lens 1. If (R1/R2) is equal to or greater than the upper limit in Formula 6, the radius of curvature of the object-side surface of the first lens 1 is relatively small, and the first lens 1 may have excessive sensitivity to eccentricity. If (R1/R2) is equal to or less than the lower limit in Formula 6, the possibility of coma aberration increases.

Formula 7 describes a relationship the relationship between the focal length of the photographing lenses L and the radius of curvature of the object-side surface of the second lens 2. If (F/R4) is equal to or greater than the upper limit in Formula 7, flares may likely occur on the image-side surface of the second lens 2, and if (F/R4) is equal to or less than the lower limit in Formula 7, the refractive power of the second lens 2 is low, and thus it may be difficult to correct chromatic aberration.

In the descriptions of photographing lenses according to the embodiments of the present disclosure, the term "aspheric" or "aspheric surface" has the following definition.

When an optical axis is set as an z-axis, a direction perpendicular to the optical axis is set as a y-axis, and the propagation direction of rays is denoted as a positive direction, an aspheric surface of a lens may be defined by the following Formula 8. In Formula 8, Z denotes a distance measured from the vertex of a lens in the direction of the optical axis of the lens, Y denotes a distance measured from the optical axis in a direction perpendicular to the optical axis, K denotes a conic constant, A, B, C, D, E, and F denote aspheric coefficients, and c denotes the reciprocal (1/R) of the radius of curvature at the vertex of the lens.

$$Z = \frac{cY^2}{1+\sqrt{1-(1+K)c^2Y^2}} + AY^4 + BY^6 + CY^8 + DY^{10} + EY^{12} + FY^{14} + \ldots \quad <\text{Formula 8}>$$

embodiments of the present disclosure may provide variously designed photographing lenses as described below.

In the following embodiments, lens surfaces are sequentially numbered with S1, S2, S3, S4 . . . , Sn in a direction from an object side O to an image side I.

<First Embodiment>

Figure 2:
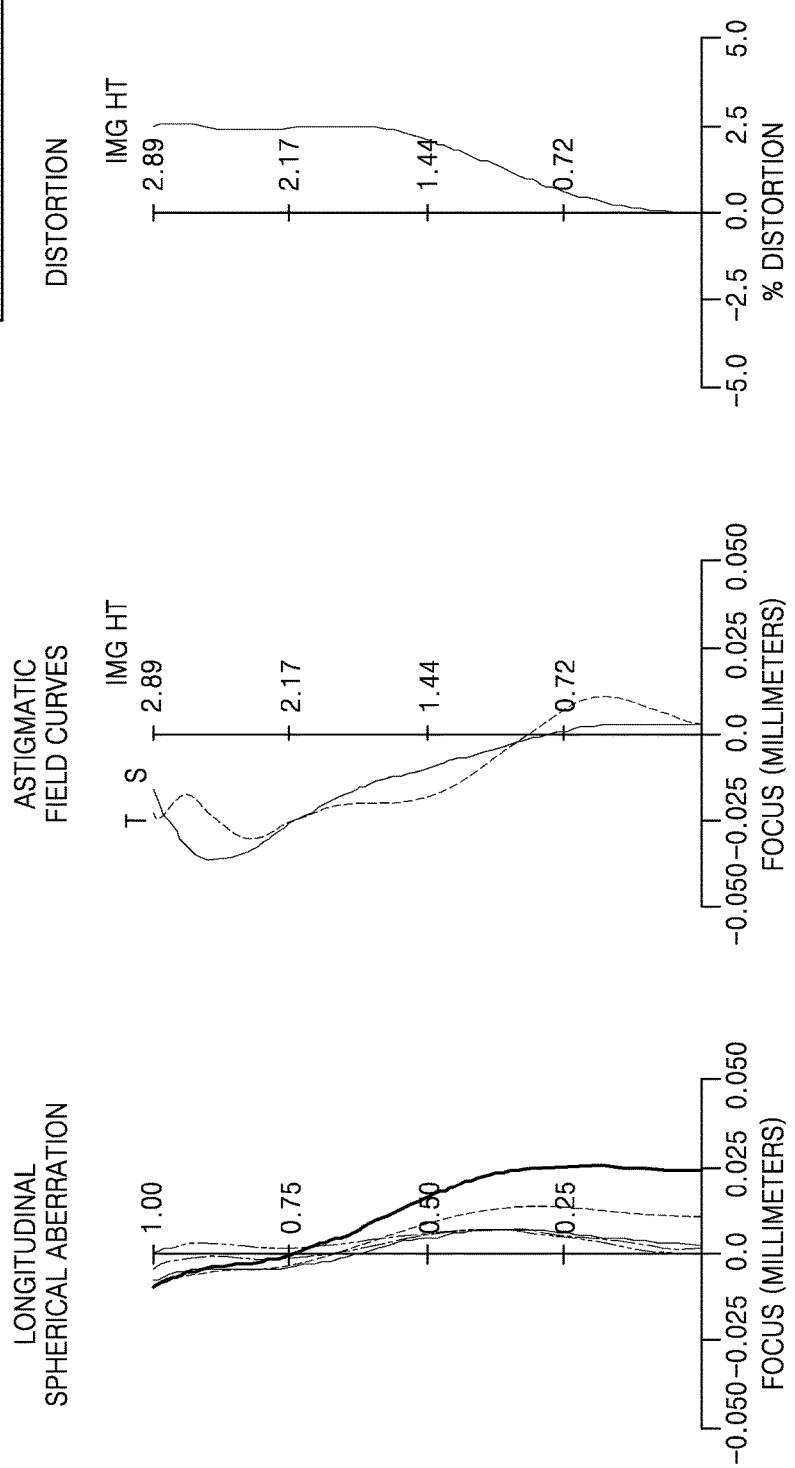
FIG. 2 illustrates aberration diagrams of the photographing lenses arranged in the first embodiment shown in FIG. 1.

Tables 1 and 2 show lens data according to a first embodiment. FIG. 1 illustrates the photographing lenses L according to the first embodiment, and FIG. 2 illustrates aberration diagrams of the photographing lenses L according to the first embodiment.

In the first embodiment, the F-number of the photographing lenses L is 2.45, the half angle of view of the photographing lenses L is 35.85°, the focal length F of the photographing lenses L is 3.904 mm, the focal length F1 of the first lens 1 is 2.51 mm, the focal length F2 of the second lens 2 is −4.07 mm, and the focal length F4 of the fourth lens 4 is −250 mm.

TABLE 1

| Lens surfaces | Radius of curvature | Thickness, air gap | Refractive power | Abbe number | Notes |
|---|---|---|---|---|---|
| Object | ∞ | ∞ | | | |
| S1 | ∞ | −0.1500 | | | Aperture stop (ST) |
| S2 | 1.7420 | 0.7328 | 1.5441 | 56 | |
| S3 | −5.4536 | 0.0819 | | | |
| S4 | ∞ | 0.2450 | 1.6516 | 21 | |
| S5 | 2.6800 | 0.2823 | | | |
| S6 | −9.1218 | 0.3621 | 1.5441 | 56 | |
| S7 | −3.1346 | 0.1785 | | | |
| S8 | −1.8982 | 0.3804 | 1.6516 | 21 | |
| S9 | −2.0732 | 0.6040 | | | |
| S10 | 1.9968 | 0.6351 | 1.5348 | 56 | |
| S11 | 1.2136 | 0.2779 | | | |
| S12 | ∞ | 0.2000 | 1.5168 | 64 | IR-cut filter |
| S13 | ∞ | 0.6726 | | | |

Table 2 below shows aspheric coefficients in the first embodiment.

FIG. 2 illustrates longitudinal spherical aberration, astigmatic field curves, and distortion of the photographing lenses L of the first embodiment. The astigmatic field curves include a tangential field curvature T and a sagittal field curvature S.

<Second Embodiment>

Figure 3:
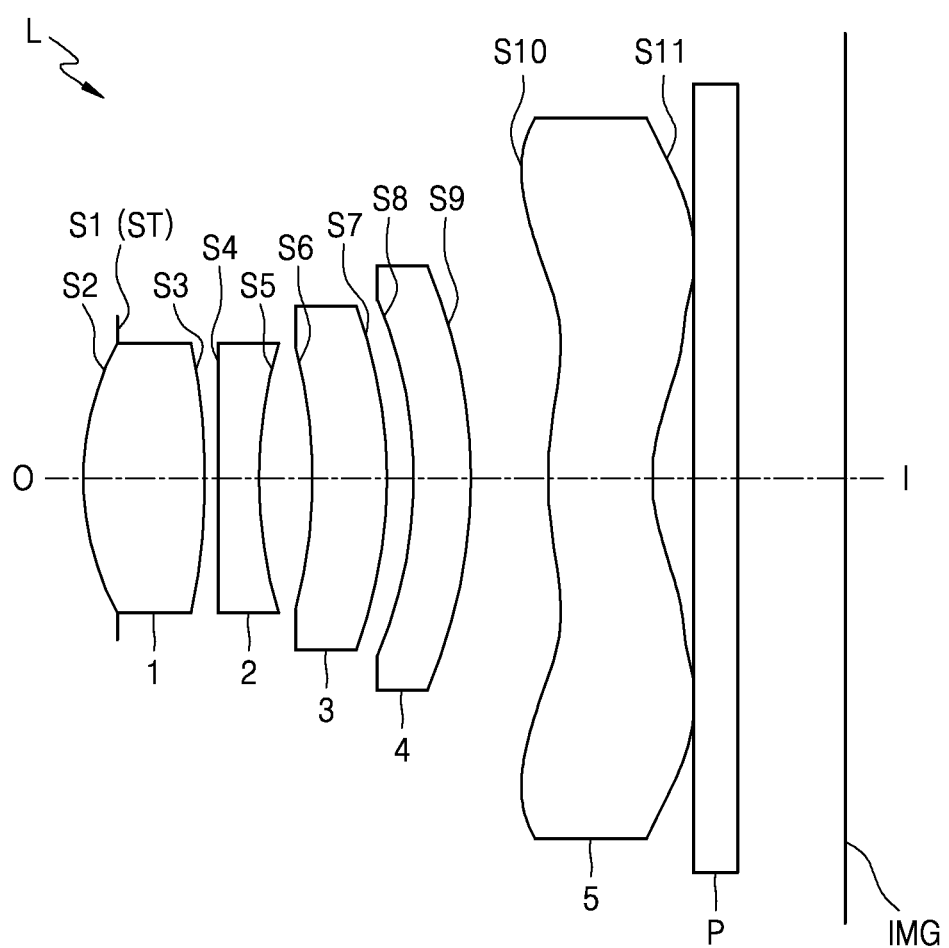
FIG. 3 illustrates an arrangement of photographing lenses according to a second embodiment of the present disclosure.
Figure 4:
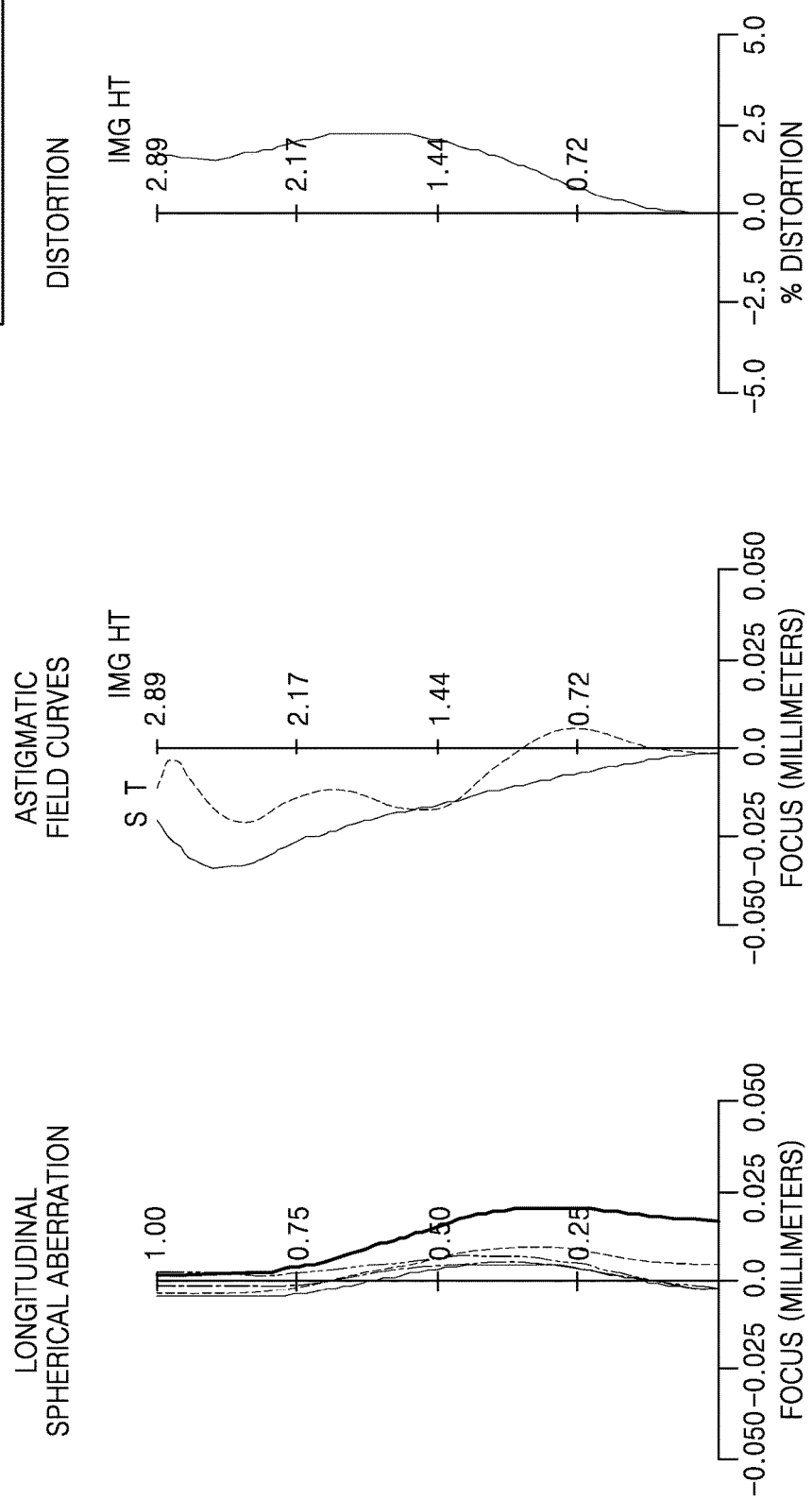
FIG. 4 illustrates aberration diagrams of the photographing lenses of the second embodiment of the present disclosure shown in FIG. 3.

Tables 3 and 4 below show lens data according to a second embodiment. FIG. 3 illustrates photographing lenses L according to the second embodiment, and FIG. 4 illustrates aberration diagrams of the photographing lenses L according to the second embodiment.

In the second embodiment, the F-number of the photographing lenses L is 2.35, the half angle of view of the photographing lenses L is 34.74°, the focal length F of the photographing lenses L is 4.1 mm, the focal length F1 of a first lens 2 is 2.65 mm, the focal length F2 of a second lens 2 is −4.12 mm, and the focal length F4 of a fourth lens 4 is −150 mm.

TABLE 3

| Lens surfaces | Radius of curvature | Thickness, air gap | Refractive power | Abbe number | Notes |
|---|---|---|---|---|---|
| Object | ∞ | ∞ | | | |
| S1 | ∞ | −0.2100 | | | Aperture stop (ST) |
| S2 | 1.8085 | 0.7666 | 1.5441 | 56 | |
| S3 | −6.1795 | 0.0955 | | | |
| S4 | ∞ | 0.2800 | 1.6416 | 23.1 | |
| S5 | 2.6727 | 0.3410 | | | |
| S6 | −10.0181 | 0.5092 | 1.5441 | 56 | |
| S7 | −2.9808 | 0.1575 | | | |
| S8 | −2.0563 | 0.4000 | 1.6416 | 23.1 | |
| S9 | −2.2614 | 0.5007 | | | |
| S10 | 2.2810 | 0.6898 | 1.5348 | 56 | |
| S11 | 1.3667 | 0.2696 | | | |
| S12 | ∞ | 0.3000 | 1.5168 | 64 | IR-cut filter |
| S13 | ∞ | 0.6878 | | | |

Table 4 below shows aspheric coefficients in the second embodiment.

TABLE 2

| Surfaces | R | K | A | B | C | D | E | F |
|---|---|---|---|---|---|---|---|---|
| S2 | 1.7420E+00 | −2.7089E−01 | −1.1451E−02 | 2.3537E−02 | −1.0405E−01 | 1.2226E−01 | −9.4137E−02 | 2.1640E−02 |
| S3 | −5.4536E+00 | −6.6082E+01 | −3.4491E−03 | −5.8807E−02 | −2.9719E−02 | 1.2112E−01 | −1.4181E−01 | 4.7504E−02 |
| S4 | ∞ | 0.0000E+00 | 0.0000E+00 | 0.0000E+00 | 0.0000E+00 | 0.0000E+00 | 0.0000E+00 | 0.0000E+00 |
| S5 | 2.6800E+00 | −2.4394E+01 | 5.0500E−02 | −2.9662E−02 | 2.9122E−02 | 1.2805E−02 | −4.9096E−02 | −8.2438E−03 |
| S6 | −9.1218E+00 | 9.7288E+01 | −1.1977E−01 | 1.3176E−02 | 1.7550E−01 | −6.9958E−02 | 1.4220E−02 | −3.6851E−02 |
| S7 | 3.1346E+00 | 6.2061E+01 | −9.3480E−02 | 2.9682E−02 | 5.9453E−02 | −7.4083E−02 | 4.6364E−02 | −6.2710E−03 |
| S8 | −1.8982E+00 | −1.8174E+01 | 5.0573E−02 | −8.3517E−02 | 4.1434E−03 | −7.4445E−03 | 8.5356E−03 | −2.0719E−02 |
| S9 | −2.0732E+00 | 1.1973E+00 | 1.4505E−01 | −8.2076E−02 | 4.8595E−02 | −9.7216E−03 | −9.3632E−03 | 6.0759E−03 |
| S10 | 1.9968E+00 | −1.1973E+01 | −1.1060E−01 | 1.0601E−02 | 5.6657E−03 | −7.7997E−04 | −1.0799E−04 | 1.7776E−05 |
| S11 | 1.2136E+00 | −4.8552E+00 | −7.6342E−02 | 2.2209E−02 | −5.8336E−03 | 9.3482E−04 | −8.0037E−05 | 3.0797E−06 |

TABLE 4

| Lens surfaces | R | K | A | B | C | D | E | F |
|---|---|---|---|---|---|---|---|---|
| S2 | 1.8085E+00 | −2.0315E−01 | −9.5962E−03 | 2.5612E−02 | −9.6010E−02 | 1.2328E−01 | −9.3204E−02 | 2.1965E−02 |
| S3 | −6.1795E+00 | −5.6074E+01 | 2.9209E−03 | −4.4636E−02 | −2.9317E−02 | 1.0071E−01 | −1.2323E−01 | 4.7504E−02 |
| S4 | ∞ | 0.0000E+00 | 0.0000E+00 | 0.0000E+00 | 0.0000E+00 | 0.0000E+00 | 0.0000E+00 | 0.0000E+00 |
| S5 | 2.6727E+00 | −1.9017E+01 | 6.1862E−02 | −1.8169E−02 | 6.3174E−03 | 3.6842E−02 | −2.2048E−02 | −8.2438E−03 |
| S6 | −1.0018E+01 | 1.0452E+02 | −9.9797E−02 | 1.1186E−02 | 9.7518E−02 | −1.1215E−01 | 1.0970E−01 | −3.6851E−02 |
| S7 | −2.9808E+00 | −4.7499E+01 | −1.3040E−01 | 3.6126E−02 | 6.0222E−02 | −7.4471E−02 | 4.3033E−02 | −8.8532E−03 |
| S8 | −2.0563E+00 | −2.0480E+01 | 8.7344E−03 | −6.0940E−02 | 5.7502E−02 | −1.4889E−02 | −1.5116E−02 | 6.0700E−03 |
| S9 | −2.2614E+00 | 1.2381E+00 | 1.1540E−01 | −8.2993E−02 | 5.3230E−02 | −4.1508E−03 | −8.7576E−03 | 3.0761E−03 |
| S10 | 2.2810E+00 | −1.0311E+01 | −1.1530E−01 | 1.0341E−02 | 5.7125E−03 | −7.2556E−04 | −9.8304E−05 | 1.4873E−05 |
| S11 | 1.3667E+00 | −4.1487E+00 | −8.3146E−02 | 2.4856E−02 | −6.0823E−03 | 9.1557E−04 | −8.0681E−05 | 3.6922E−06 |

<Third Embodiment>

Figure 5:
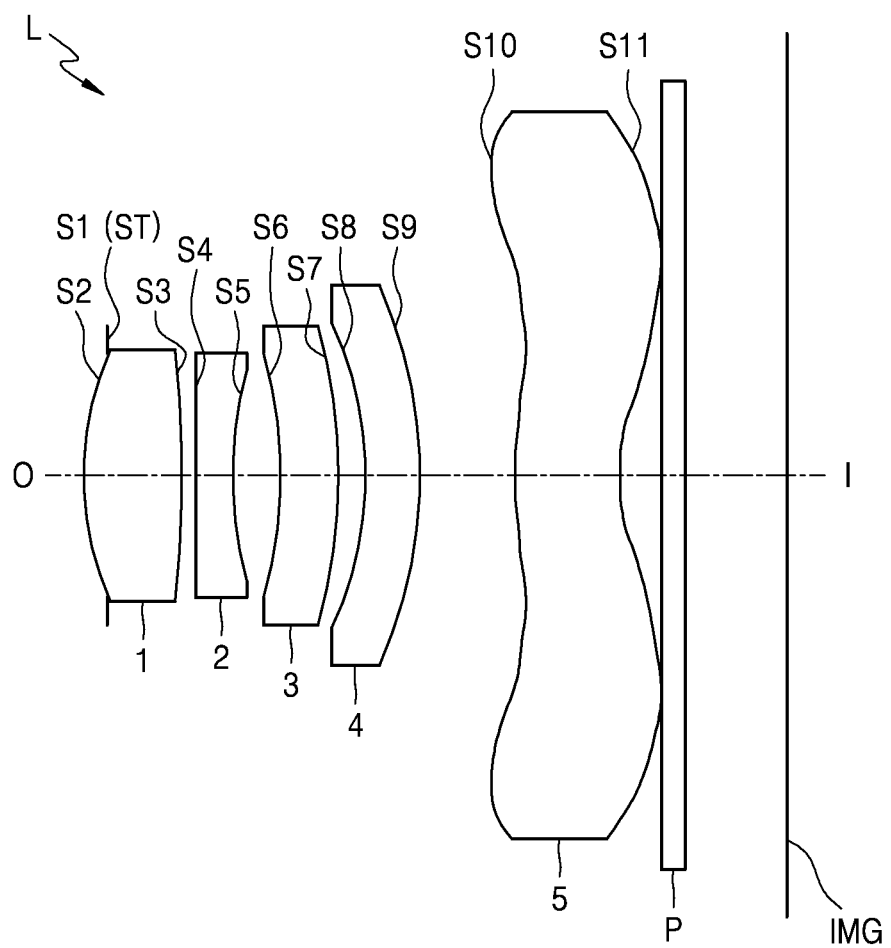
FIG. 5 illustrates an arrangement of photographing lenses according to a third embodiment of the present disclosure.
Figure 6:
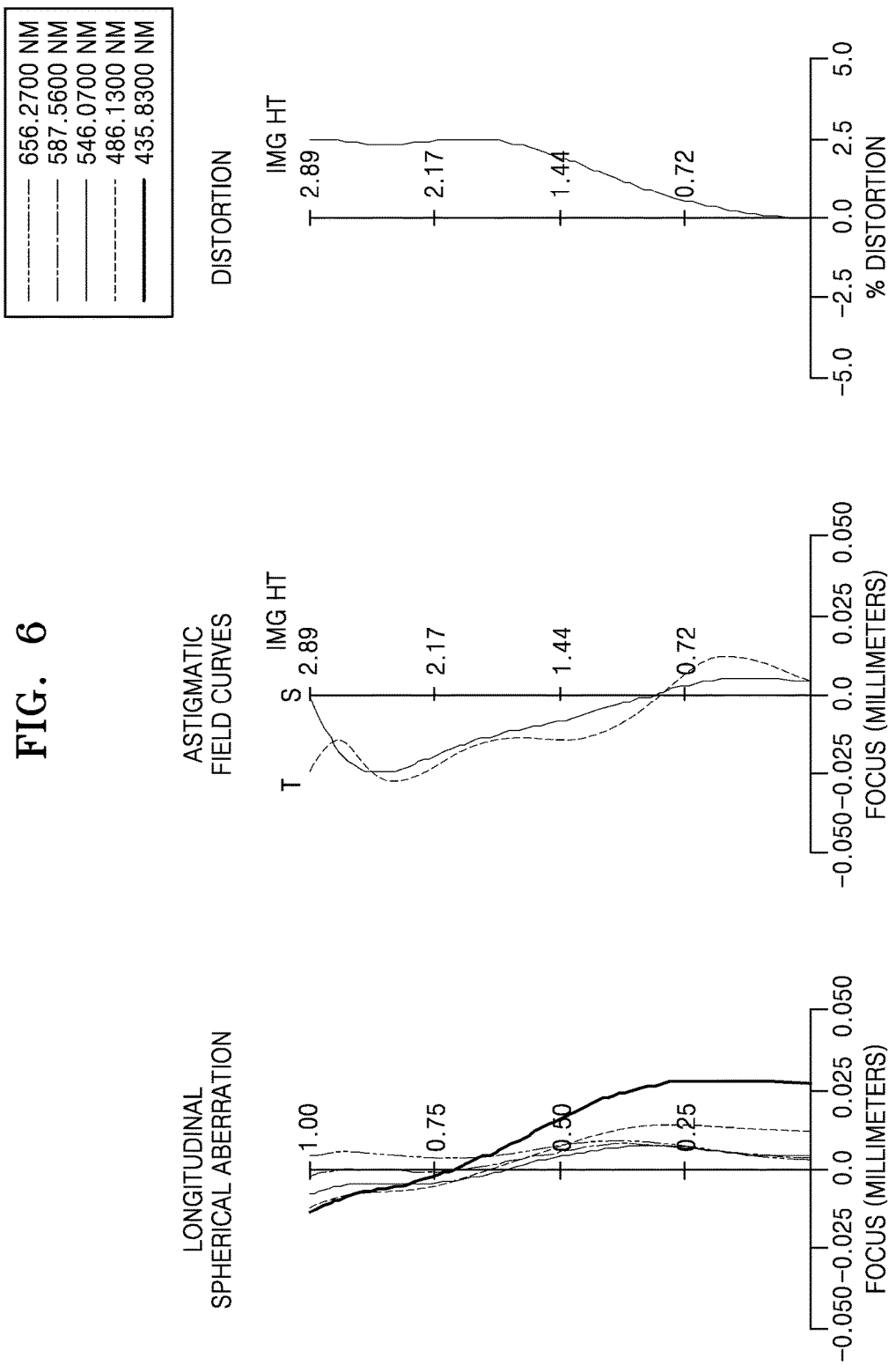
FIG. 6 illustrates aberration diagrams of the photographing lenses of the third embodiment of the present disclosure shown in FIG. 5.

Tables 5 and 6 herein below show lens data according to a third embodiment. FIG. 5 illustrates photographing lenses L according to the third embodiment, and FIG. 6 illustrates aberration diagrams of the photographing lenses L according to the third embodiment.

In the third embodiment, the F-number of the photographing lenses L is 2.45, the half angle of view of the photographing lenses L is 35.9°, the focal length F of the photographing lenses L is 3.898 mm, the focal length F1 of a first lens 1 is 2.488 mm, the focal length F2 of a second lens 2 is −4.184 mm, and the focal length F4 of a fourth lens 4 is −99.21 mm.

TABLE 5

| Lens surfaces | Radius of curvature | Thickness, air gap | Refractive power | Abbe number | Notes |
|---|---|---|---|---|---|
| Object | ∞ | ∞ | | | |
| S1 | ∞ | −0.1500 | | | Aperture stop (ST) |
| S2 | 1.7323 | 0.6539 | 1.5441 | 56 | |
| S3 | −5.4809 | 0.0861 | | | |
| S4 | ∞ | 0.2400 | 1.6504 | 21.5 | |
| S5 | 2.7506 | 0.2968 | | | |
| S6 | −8.0944 | 0.3980 | 1.5441 | 56 | |
| S7 | −3.0946 | 0.1901 | | | |
| S8 | −1.8626 | 0.3600 | 1.6504 | 21.5 | |
| S9 | −2.0644 | 0.6111 | | | |
| S10 | 2.1049 | 0.6953 | 1.5348 | 56 | |
| S11 | 1.2477 | 0.2738 | | | |
| S12 | ∞ | 0.1500 | 1.5168 | 64 | IR-cut filter |
| S13 | ∞ | 0.6741 | | | |

Table 6 below shows aspheric coefficients in the third embodiment.

<Fourth Embodiment>

Figure 7:
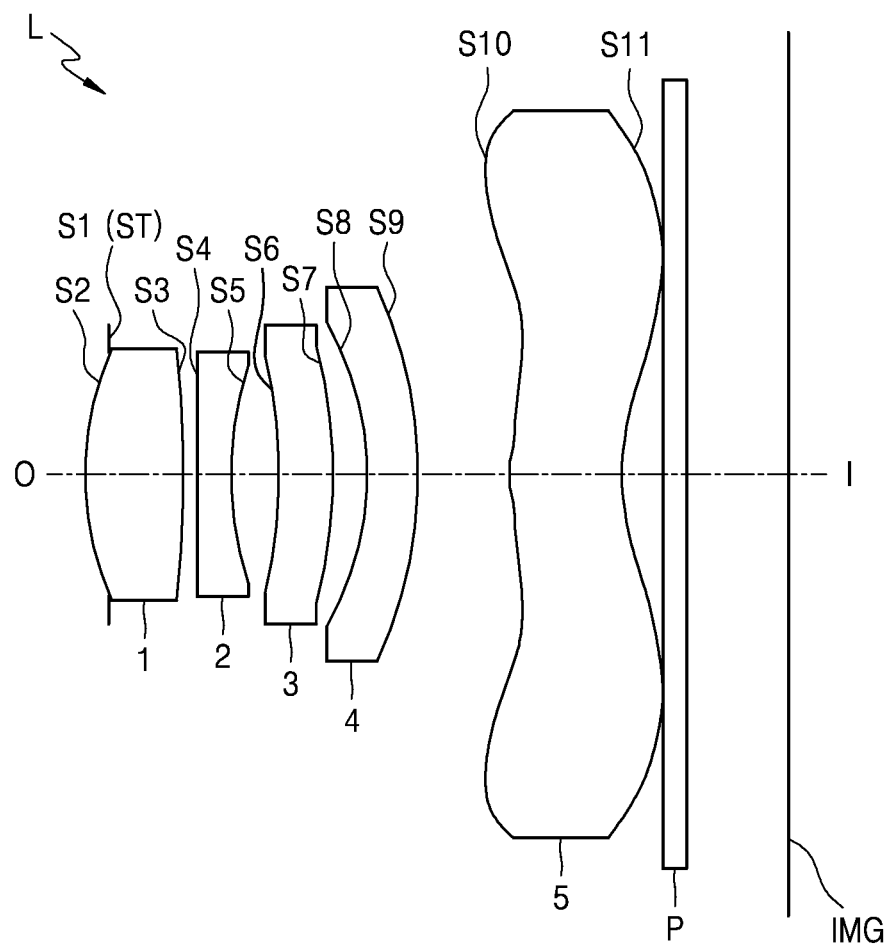
FIG. 7 illustrates an arrangement of photographing lenses according to a fourth embodiment of the present disclosure.
Figure 8:
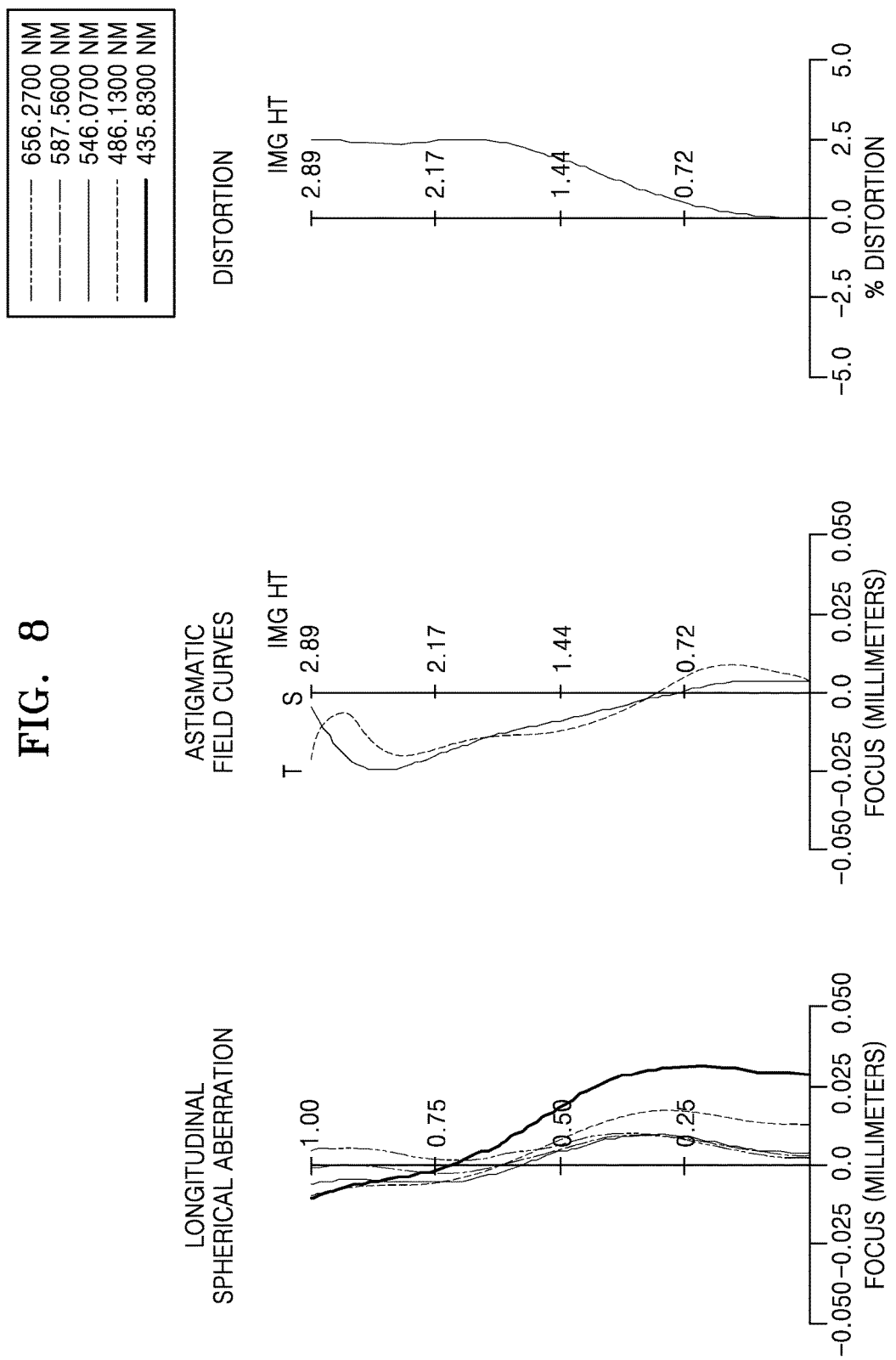
FIG. 8 illustrates aberration diagrams of the photographing lenses of the fourth embodiment of the present disclosure shown in FIG. 7.

Tables 7 and 8 herein below show lens data according to a fourth embodiment. FIG. 7 illustrates photographing lenses L according to the fourth embodiment, and FIG. 8 illustrates aberration diagrams of the photographing lenses L according to the fourth embodiment.

In the fourth embodiment, the F-number of the photographing lenses L is 2.45, the half angle of view of the photographing lenses L is 35.9°, the focal length F of the photographing lenses L is 3.898 mm, the focal length F1 of a first lens 1 is 2.502 mm, the focal length F2 of a second lens 2 is −4.254 mm, and the focal length F4 of a fourth lens 4 is −37.586 mm.

TABLE 7

| Lens surfaces | Radius of curvature | Thickness, air gap | Refractive power | Abbe number | Notes |
|---|---|---|---|---|---|
| Object | ∞ | ∞ | | | |
| S1 | ∞ | −0.1500 | | | Aperture stop (ST) |
| S2 | 1.7298 | 0.6500 | 1.5441 | 56 | |
| S3 | −5.6536 | 0.0858 | | | |
| S4 | ∞ | 0.2400 | 1.6504 | 21.5 | |
| S5 | 2.7966 | 0.2960 | | | |
| S6 | −7.7380 | 0.3657 | 1.5441 | 56 | |
| S7 | −2.9529 | 0.2025 | | | |
| S8 | −1.8118 | 0.3600 | 1.6504 | 21.5 | |
| S9 | −2.1093 | 0.6028 | | | |
| S10 | 2.1100 | 0.7352 | 1.5348 | 56 | |
| S11 | 1.2817 | 0.2669 | | | |
| S12 | ∞ | 0.1500 | 1.5168 | 64 | IR-cut filter |
| S13 | ∞ | 0.6738 | | | |

Table 8 below shows aspheric coefficients in the fourth embodiment.

TABLE 6

| Lens surfaces | R | K | A | B | C | D | E | F |
|---|---|---|---|---|---|---|---|---|
| S2 | 1.7323E+00 | −2.5816E−01 | −1.0152E−02 | 1.7388E−02 | −1.0433E−01 | 1.2506E−01 | −1.0026E−01 | 1.8468E−02 |
| S3 | −5.4809E+00 | −7.1599E+01 | −1.1827E−03 | −5.4963E−02 | −3.3789E−02 | 9.9281E−02 | −1.2487E−01 | 4.7504E−02 |
| S4 | ∞ | 0.0000E+00 | 0.0000E+00 | 0.0000E+00 | 0.0000E+00 | 0.0000E+00 | 0.0000E+00 | 0.0000E+00 |
| S5 | 2.7506E+00 | −2.4590E+01 | 3.6366E−02 | −4.1954E−02 | 3.5901E−02 | 2.3600E−02 | −6.0953E−02 | −8.2438E−03 |
| S6 | −8.0944E+00 | 7.6768E+01 | −1.0482E−01 | −1.8911E−02 | 1.5500E−01 | −5.8127E−02 | 5.1986E−02 | −3.6852E−02 |
| S7 | −3.0946E+00 | −6.0861E+01 | −8.6787E−02 | 5.6176E−03 | 5.5537E−02 | −6.8064E−02 | 5.1767E−02 | −5.7525E−03 |
| S8 | −1.8626E+00 | −1.8129E+01 | 2.8585E−02 | −7.6967E−02 | −4.1065E−04 | −7.8488E−03 | 1.5181E−02 | −2.5219E−02 |
| S9 | −2.0644E+00 | 1.2695E+00 | 1.3159E−01 | −7.6516E−02 | 5.1140E−02 | −1.0528E−02 | −9.8510E−03 | 6.9349E−03 |
| S10 | 2.1049E+00 | −1.4928E+01 | −1.0899E−01 | 1.0952E−02 | 5.6367E−03 | −7.9019E−04 | −1.0884E−04 | 1.8139E−05 |
| S11 | 1.2477E+00 | −5.2291E+00 | −7.2029E−02 | 2.1770E−02 | −5.8220E−03 | 9.3019E−04 | −8.1486E−05 | 3.3726E−06 |

TABLE 8

| Lens surfaces | R | K | A | B | C | D | E | F |
|---|---|---|---|---|---|---|---|---|
| S2 | 1.7298E+00 | −2.8107E−01 | −9.8053E−03 | 1.8590E−02 | −1.1040E−01 | 1.3534E−01 | −1.0474E−01 | 1.8653E−02 |
| S3 | −5.6536E+00 | −8.0060E+01 | −5.7905E−03 | −4.7169E−02 | −2.4152E−02 | 5.7792E−02 | −8.8765E−02 | 4.7504E−02 |
| S4 | ∞ | 0.0000E+00 | 0.0000E+00 | 0.0000E+00 | 0.0000E+00 | 0.0000E+00 | 0.0000E+00 | 0.0000E+00 |
| S5 | 2.7966E+00 | −2.1504E+01 | 2.6715E−02 | −4.4302E−02 | 6.7033E−02 | −2.4101E−02 | −4.1691E−02 | −8.2438E−03 |
| S6 | −7.7380E+00 | 7.0189E+01 | −6.9953E−02 | −8.5577E−02 | 1.8094E−01 | −5.7259E−05 | 8.7223E−03 | −3.6852E−02 |
| S7 | −2.9529E+00 | −6.0005E+01 | −7.4399E−02 | −2.6116E−02 | 5.2296E−02 | −4.9755E−02 | 6.7901E−02 | −1.9433E−02 |
| S8 | −1.8118E+00 | −1.8655E+01 | −3.3446E−03 | −7.1790E−02 | −6.6175E−03 | −8.9456E−03 | 2.2171E−02 | −2.6890E−02 |
| S9 | −2.1093E+00 | 1.5137E+00 | 1.0604E−01 | −7.3322E−02 | 5.5022E−02 | −8.4821E−03 | −1.0929E−02 | 8.1085E−03 |
| S10 | 2.1100E+00 | −1.4570E+01 | −1.1596E−01 | 1.3253E−02 | 5.6823E−03 | −8.3948E−04 | −1.1601E−04 | 1.9781E−05 |
| S11 | 1.2817E+00 | −5.2982E+00 | −7.2092E−02 | 2.1715E−02 | −5.7575E−03 | 9.3318E−04 | −8.6905E−05 | 3.9676E−06 |

<Fifth Embodiment>

Figure 9:
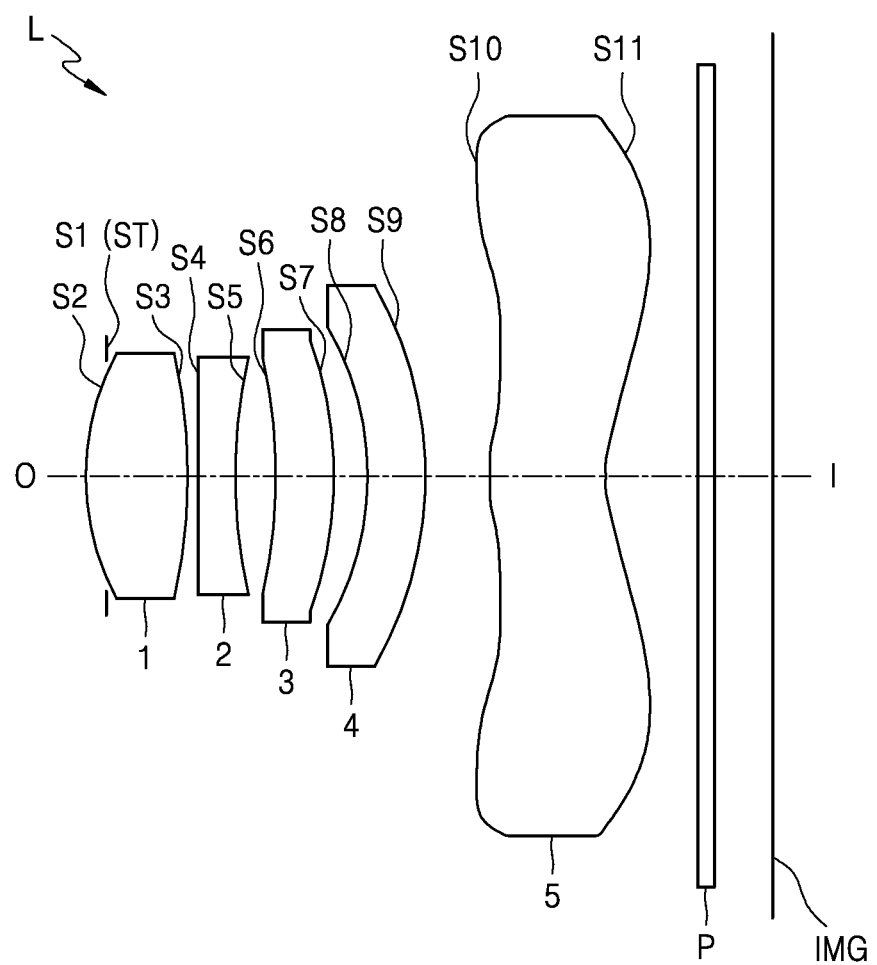
FIG. 9 illustrates an arrangement photographing lenses according to a fifth embodiment of the present disclosure.
Figure 10:
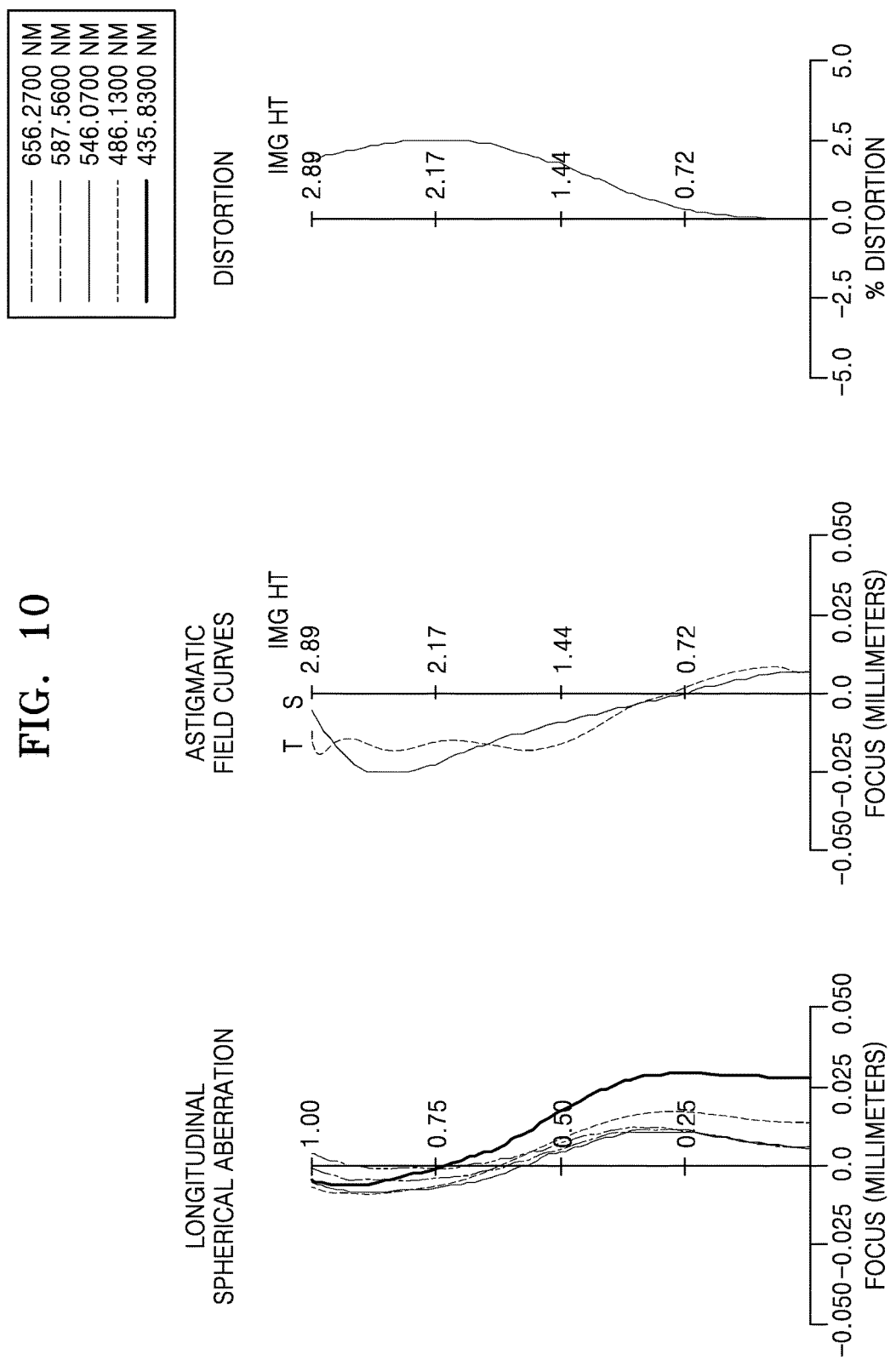
FIG. 10 illustrates aberration diagrams of the photographing lenses of the fifth embodiment of the present disclosure shown in FIG. 9.

Tables 9 and 10 herein below show lens data according to a fifth embodiment. FIG. 9 illustrates photographing lenses L according to the fifth embodiment, and FIG. 10 illustrates aberration diagrams of the photographing lenses L according to the fifth embodiment.

In the fifth embodiment, the F-number of the photographing lenses L is 2.44, the half angle of view of the photographing lenses L is 37.23°, the focal length F of the photographing lenses L is 3.74 mm, the focal length F1 of a first lens 1 is 2.524 mm, the focal length F2 of a second lens 2 is −4.727 mm, and the focal length F4 of a fourth lens 4 is −16.477 mm.

TABLE 9

| Lens surfaces | Radius of curvature | Thickness, air gap | Refractive power | Abbe number | Notes |
|---|---|---|---|---|---|
| Object | ∞ | ∞ | | | |
| S1 | ∞ | −0.1400 | | | Aperture stop (ST) |
| S2 | 1.7319 | 0.6500 | 1.5441 | 56 | |
| S3 | −5.8821 | 0.0827 | | | |
| S4 | ∞ | 0.2400 | 1.6504 | 21.5 | |
| S5 | 3.1072 | 0.2852 | | | |
| S6 | −6.0222 | 0.3664 | 1.5441 | 56 | |
| S7 | −2.6097 | 0.2255 | | | |
| S8 | −1.5235 | 0.3683 | 1.6504 | 21.5 | |
| S9 | −1.9429 | 0.4234 | | | |
| S10 | 1.7695 | 0.7734 | 1.5348 | 56 | |
| S11 | 1.2021 | 0.2906 | | | |
| S12 | ∞ | 0.1100 | 1.5168 | 64 | IR-cut filter |
| S13 | ∞ | 0.7116 | | | |

Table 10 below shows aspheric coefficients in the fifth embodiment.

<Sixth Embodiment>

Figure 11:
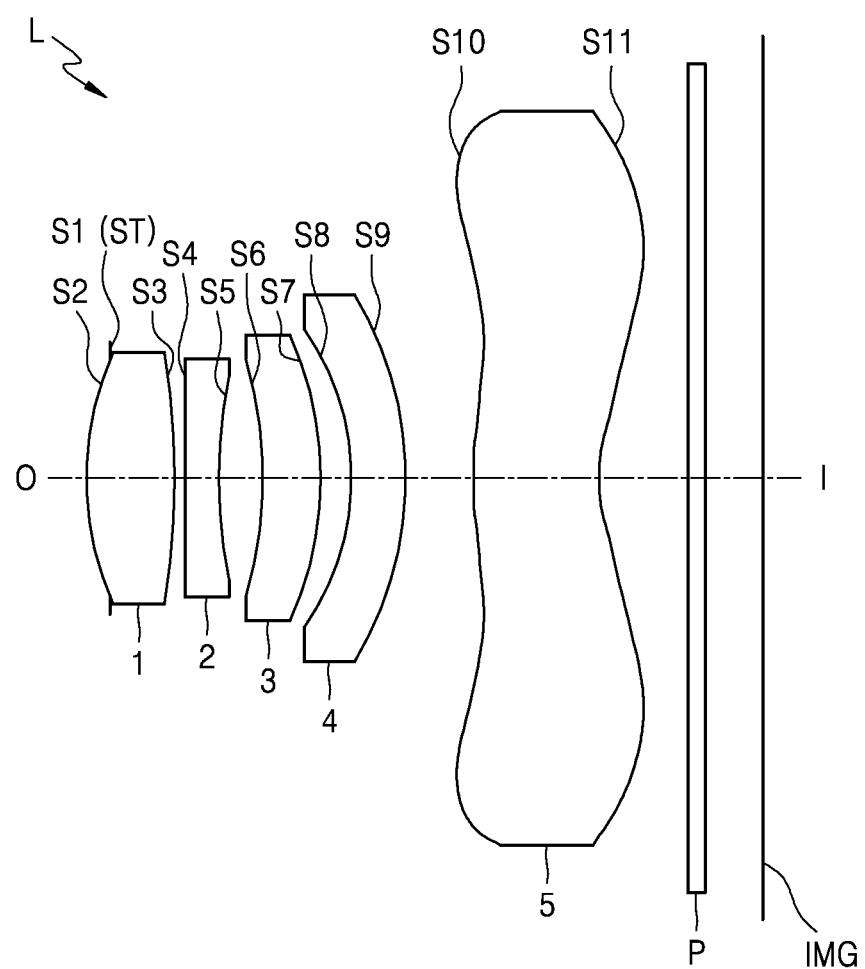
FIG. 11 illustrates an arrangement of photographing lenses according to a sixth embodiment of the present disclosure.
Figure 12:
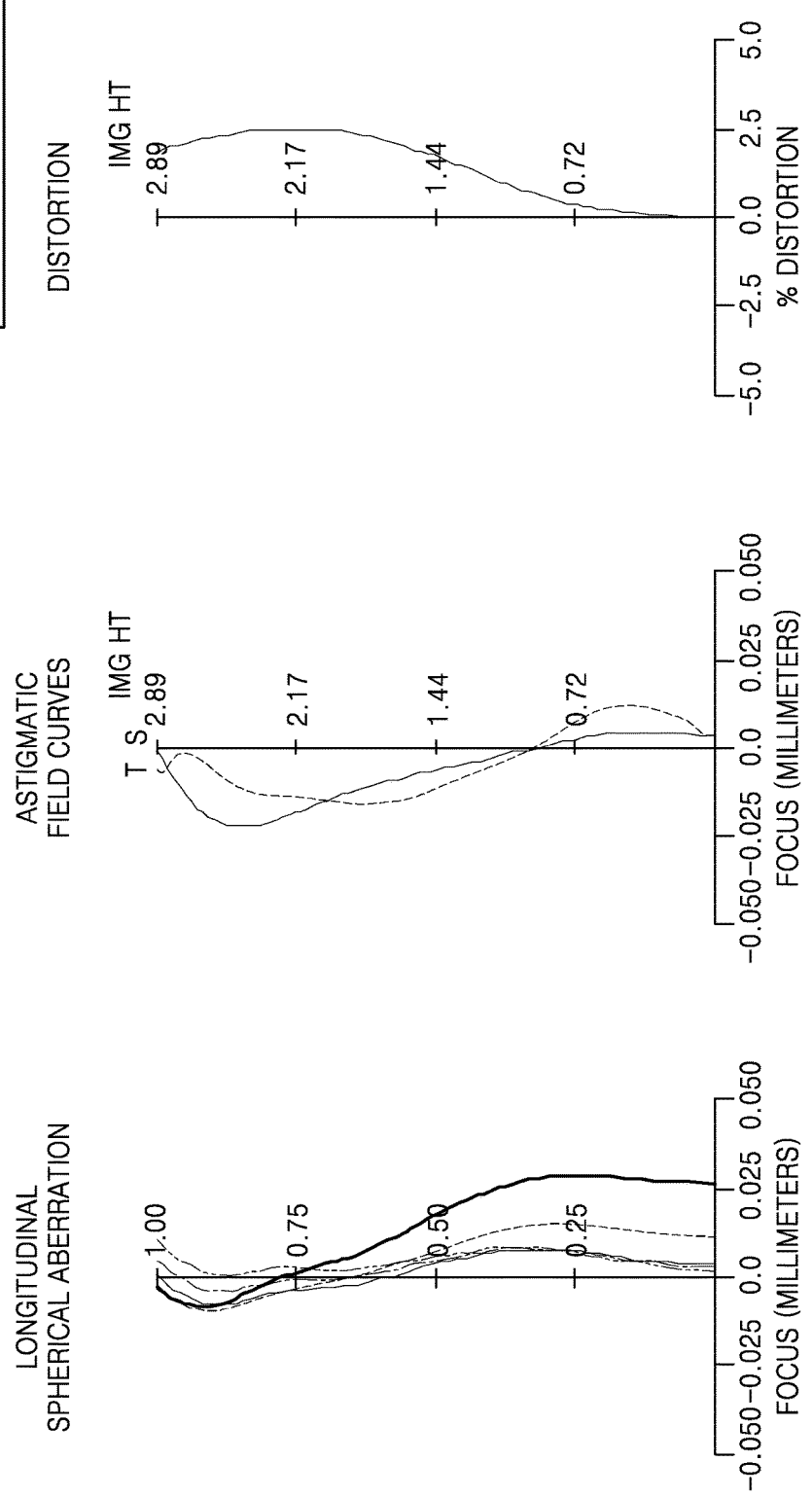
FIG. 12 illustrates aberration diagrams of the photographing lenses of the sixth embodiment of the present disclosure shown in FIG. 11.

Tables 11 and 12 herein below show lens data according to a sixth embodiment. FIG. 11 illustrates photographing lenses L according to the sixth embodiment, and FIG. 12 illustrates aberration diagrams of the photographing lenses L according to the sixth embodiment.

In the sixth embodiment, the F-number of the photographing lenses L is 2.45, the half angle of view of the photographing lenses L is 38.11°, the focal length F of the photographing lenses L is 3.62 mm, the focal length F1 of a first lens 1 is 2.496 mm, the focal length F2 of a second lens 2 is −4.998 mm, and the focal length F4 of a fourth lens 4 is −11.411 mm.

TABLE 11

| Lens surfaces | Radius of curvature | Thickness, air gap | Refractive power | Abbe number | Notes |
|---|---|---|---|---|---|
| Object | ∞ | ∞ | | | |
| S1 | ∞ | −0.1500 | | | Aperture stop (ST) |
| S2 | 1.7047 | 0.5851 | 1.5441 | 56 | |
| S3 | −5.9921 | 0.0694 | | | |
| S4 | ∞ | 0.2200 | 1.6504 | 21.5 | |
| S5 | 3.2857 | 0.2951 | | | |
| S6 | −5.2722 | 0.3728 | 1.5441 | 56 | |
| S7 | −2.1553 | 0.2042 | | | |
| S8 | −1.2306 | 0.3506 | 1.6504 | 21.5 | |
| S9 | −1.6385 | 0.4503 | | | |
| S10 | 1.8932 | 0.8307 | 1.5348 | 56 | |
| S11 | 1.2460 | 0.2918 | | | |
| S12 | ∞ | 0.1100 | 1.5168 | 64 | IR-cut filter |
| S13 | ∞ | 0.6635 | | | |

Table 12 below shows aspheric coefficients in the sixth embodiment.

TABLE 10

| Lens surfaces | R | K | A | B | C | D | E | F |
|---|---|---|---|---|---|---|---|---|
| S2 | 1.7319E+00 | −4.4672E−01 | −1.6584E−02 | 2.2200E−02 | −1.5259E−01 | 1.4352E−01 | −4.4741E−02 | −6.0069E−02 |
| S3 | −5.8821E+00 | −4.1048E+01 | −2.2113E−02 | −7.9605E−02 | −1.3978E−02 | 5.9684E−02 | −1.0126E−01 | 4.7504E−02 |
| S4 | ∞ | 0.0000E+00 | 0.0000E+00 | 0.0000E+00 | 0.0000E+00 | 0.0000E+00 | 0.0000E+00 | 0.0000E+00 |
| S5 | 3.1072E+00 | −2.4850E+01 | 3.7284E−02 | −2.3959E−02 | 2.3177E−02 | 2.1528E−02 | −3.1495E−02 | −8.2438E−03 |
| S6 | −6.0222E+00 | 4.2050E+01 | −1.1190E−01 | −6.4291E−02 | 1.8556E−01 | 5.0139E−02 | 5.3203E−02 | −3.6851E−02 |
| S7 | −2.6097E+00 | −4.6901E+01 | −1.4999E−01 | 7.1868E−03 | 7.5621E−02 | −3.7601E−02 | 7.1974E−02 | −7.5637E−03 |
| S8 | −1.5235E+00 | −1.4963E+01 | 3.0750E−03 | −9.9580E−02 | 1.6769E−02 | 3.4815E−03 | 1.0492E−02 | −2.3377E−02 |
| S9 | −1.9429E+00 | 9.8654E−01 | 1.3864E−01 | −9.7041E−02 | 5.5711E−02 | −4.2291E−03 | −9.5983E−03 | 5.1068E−03 |
| S10 | 1.7695E+00 | −1.1865E+01 | −1.1542E−01 | 1.4369E−02 | 5.4561E−03 | −8.8790E−04 | −1.1056E−04 | 2.0545E−05 |
| S11 | 1.2021E+00 | −5.3232E+00 | −6.7483E−02 | 1.9416E−02 | −5.0607E−03 | 8.7905E−04 | −9.6030E−05 | 5.0612E−06 |

TABLE 12

| Lens surfaces | R | K | A | B | C | D | E | F |
|---|---|---|---|---|---|---|---|---|
| S2 | 1.7047E+00 | −4.7230E−01 | −1.6271E−02 | 2.3711E−02 | −1.8778E−01 | 1.7245E−01 | −2.0206E−02 | −1.3483E−01 |
| S3 | −5.9921E+00 | −5.0528E+01 | −1.8833E−02 | −8.5970E−02 | −2.5697E−02 | 1.8321E−02 | −4.9731E−02 | 4.7504E−02 |
| S4 | ∞ | 0.0000E+00 | 0.0000E+00 | 0.0000E+00 | 0.0000E+00 | 0.0000E+00 | 0.0000E+00 | 0.0000E+00 |
| S5 | 3.2857E+00 | −2.9811E+01 | 1.9374E−02 | −2.9766E−02 | 7.7593E−03 | 7.4576E−02 | −8.3451E−02 | −8.2438E−03 |
| S6 | −5.2722E+00 | 3.4477E+01 | −1.2616E−01 | −1.3662E−01 | 2.3398E−01 | 1.0879E−01 | 8.5921E−02 | −3.6852E−02 |
| S7 | −2.1553E+00 | −3.0072E+01 | −1.7594E−01 | −1.6635E−03 | 4.6754E−02 | −1.6886E−02 | 1.0684E−01 | −1.2166E−02 |
| S8 | −1.2306E+00 | −8.6694E+00 | −8.4934E−03 | −9.3761E−02 | 2.1384E−02 | −8.2400E−03 | 2.9535E−03 | −2.1143E−02 |
| S9 | −1.6385E+00 | 5.5726E−01 | 1.5202E−01 | −7.7547E−02 | 6.0668E−02 | −9.6938E−03 | −1.1402E−02 | 9.3530E−03 |
| S10 | 1.8932E+00 | −1.3869E+01 | −1.1475E−01 | 1.5715E−02 | 5.2165E−03 | −9.1413E−04 | −1.0545E−04 | 2.0735E−05 |
| S11 | 1.2460E+00 | −5.5851E+00 | −6.1531E−02 | 1.7717E−02 | −4.8126E−03 | 8.7227E−04 | −9.7381E−05 | 5.0425E−06 |

<Seventh Embodiment>

Figure 13:
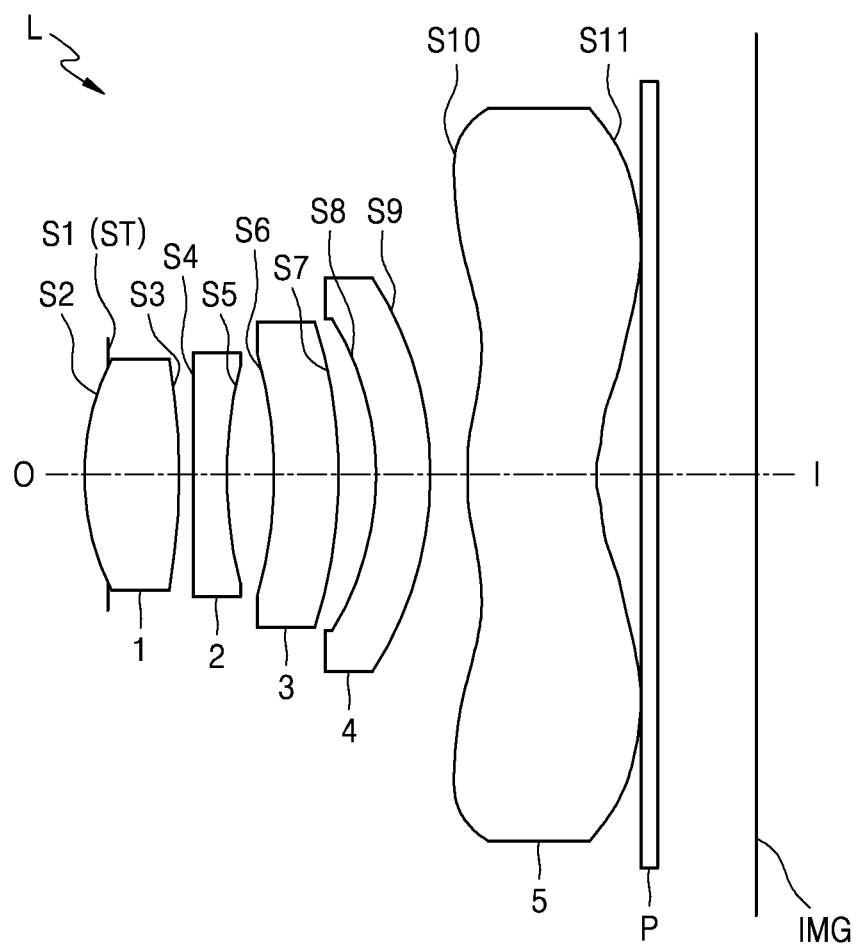
FIG. 13 illustrates an arrangement of photographing lenses according to a seventh embodiment of the present disclosure.
Figure 14:
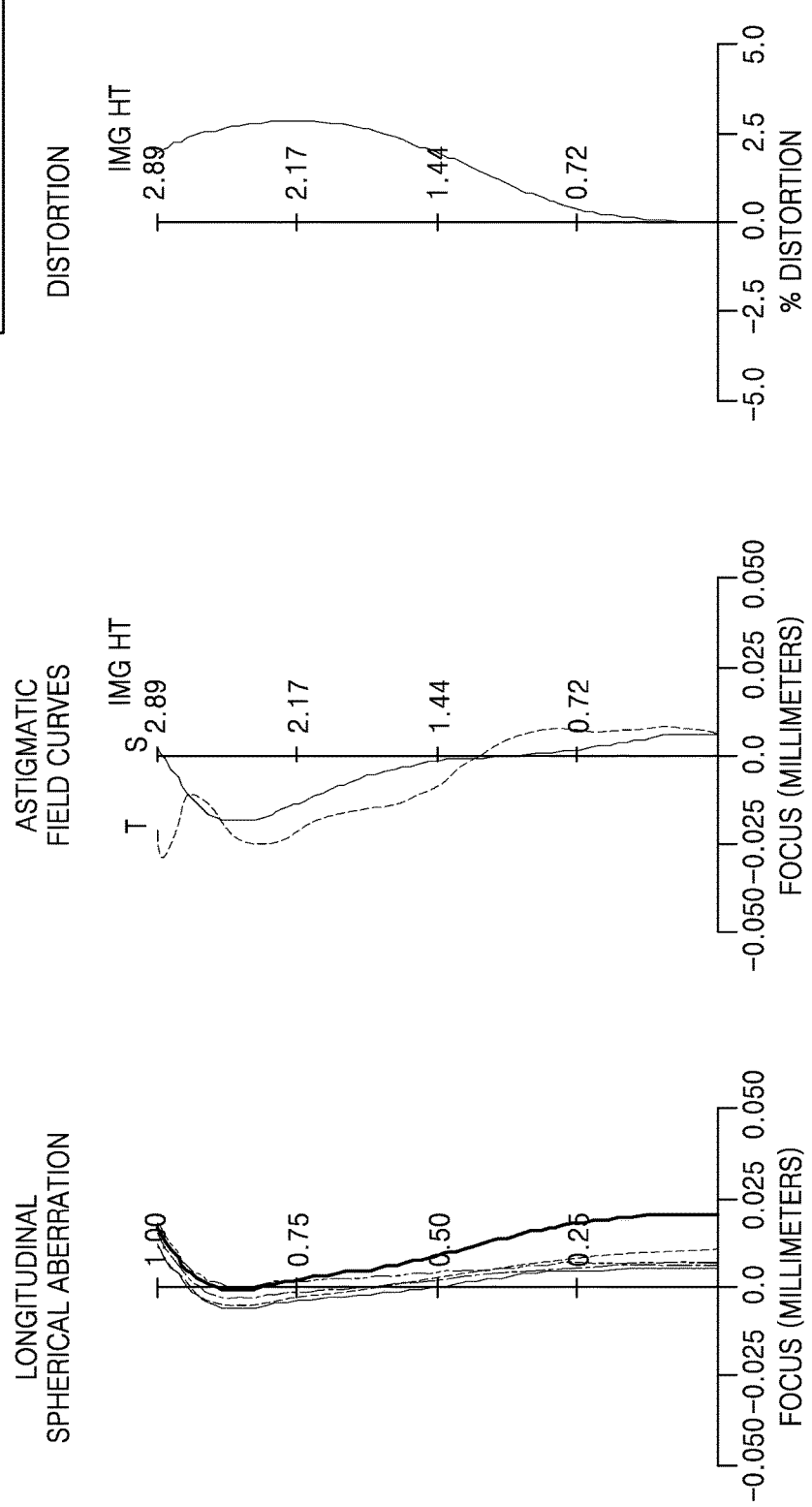
FIG. 14 illustrates aberration diagrams of the photographing lenses of the seventh embodiment of the present disclosure shown in FIG. 13.

Tables 13 and 14 herein below show lens data according to a seventh embodiment. FIG. 13 illustrates photographing lenses L according to the seventh embodiment, and FIG. 14 illustrates aberration diagrams of the photographing lenses L according to the seventh embodiment.

In the seventh embodiment, the F-number of the photographing lenses L is 2.45, the half angle of view of the photographing lenses L is 38.21°, the focal length F of the photographing lenses L is 3.606 mm, the focal length F1 of a first lens 1 is 2.55 mm, the focal length F2 of a second lens 2 is −5.387 mm, and the focal length F4 of a fourth lens 4 is −11.392 mm.

TABLE 13

| Lens surfaces | Radius of curvature | Thickness, air gap | Refractive power | Abbe number | Notes |
|---|---|---|---|---|---|
| Object | ∞ | | | | |
| S1 | ∞ | −0.1400 | | | Aperture stop (ST) |
| S2 | 1.7101 | 0.6100 | 1.5441 | 56 | |
| S3 | −6.5804 | 0.0880 | | | |
| S4 | ∞ | 0.2200 | 1.6504 | 21.5 | |
| S5 | 3.5416 | 0.3034 | | | |
| S6 | −6.8051 | 0.4288 | 1.5441 | 56 | |
| S7 | −2.9375 | 0.2539 | | | |
| S8 | −1.4302 | 0.3500 | 1.6504 | 21.5 | |
| S9 | −1.9394 | 0.2541 | | | |
| S10 | 1.6190 | 0.8446 | 1.5348 | 56 | |
| S11 | 1.1810 | 0.2921 | | | |
| S12 | ∞ | 0.1100 | 1.5168 | 64 | IR-cut filter |
| S13 | ∞ | 0.6710 | | | |

Table 14 below shows aspheric coefficients in the seventh embodiment.

TABLE 14

| Lens surfaces | R | K | A | B | C | D | E | F |
|---|---|---|---|---|---|---|---|---|
| S2 | 1.7101E+00 | −6.5656E−01 | −1.4216E−02 | −1.3117E−02 | −1.0406E−01 | 1.3064E−01 | −1.1252E−01 | −6.6810E−02 |
| S3 | −6.5804E+00 | 1.3506E+01 | −2.2038E−02 | −1.0923E−01 | 3.7304E−02 | 2.4526E−02 | −1.1869E−01 | 4.9041E−02 |
| S4 | ∞ | 0.0000E+00 | 0.0000E+00 | 0.0000E+00 | 0.0000E+00 | 0.0000E+00 | 0.0000E+00 | 0.0000E+00 |
| S5 | 3.5416E+00 | −3.6723E+01 | 5.9024E−02 | −4.3148E−03 | 1.6533E−02 | 8.4864E−03 | −1.1901E−01 | −9.1351E−03 |
| S6 | −6.8051E+00 | 5.7774E+01 | −1.1790E−01 | −3.8648E−02 | 2.8642E−01 | 3.9531E−02 | −1.7815E−01 | −3.6855E−02 |
| S7 | −2.9375E+00 | −5.9510E+01 | −1.7415E−01 | 1.1895E−02 | 1.0577E−01 | −1.5155E−02 | 5.1844E−02 | −4.0371E−02 |
| S8 | −1.4302E+00 | −1.5464E+01 | −1.4454E−02 | −1.0705E−01 | 2.8055E−02 | 1.1982E−02 | −4.9114E−03 | −1.8938E−02 |
| S9 | −1.9394E+00 | 8.6647E−01 | 1.4232E−01 | −1.1035E−01 | 6.1104E−02 | −4.6313E−03 | −1.3934E−02 | 6.4730E−03 |
| S10 | 1.6190E+00 | −1.2956E+01 | −1.3007E−01 | 2.0891E−02 | 5.2845E−03 | −9.7651E−04 | −1.4211E−04 | 2.6061E−05 |
| S11 | 1.1810E+00 | −5.5627E+00 | −6.4220E−02 | 1.8708E−02 | −4.9574E−03 | 8.7684E−04 | −9.6436E−05 | 4.9518E−06 |

In each of the above-described embodiments, the photographing lenses L include five lenses, and the refractive power of each lens is properly adjusted or located to reduce the aberration and total length of the photographing lenses L. Therefore, the photographing lenses L may have a compact shape. In addition, the photographing lenses L according to the embodiments have simple lens surfaces, and thus the present embodiment permits easier manufacture of the photographing lenses L.

Table 15 shows that the photographing lenses L of the first to seventh embodiments satisfy Formulas 1 to 7.

TABLE 15

| | *E1 | E2 | E3 | E4 | E5 | E6 | E7 |
|---|---|---|---|---|---|---|---|
| Formula1 ($V1-V2 > 25$) | 35 | 32.9 | 34.5 | 34.5 | 34.5 | 34.5 | 34.5 |

TABLE 15-continued

| | *E1 | E2 | E3 | E4 | E5 | E6 | E7 |
|---|---|---|---|---|---|---|---|
| Formula2 ($F4/F < -2$) | −64.032 | −36.605 | −25.450 | −9.642 | −4.406 | −3.152 | −3.159 |
| Formula3 ($-3 < F2/F1 < -1$) | −1.623 | −1.556 | −1.681 | −1.701 | −1.872 | −2.003 | −2.113 |
| Formula4 ($-2 < F2/F < -0.8$) | −1.042 | −1.006 | −1.073 | −1.091 | −1.264 | −1.381 | −1.494 |
| Formula5 ($F5/F < -1.5$) | −2.059 | −2.104 | −2.042 | −2.261 | −3.563 | −3.399 | −6.913 |
| Formula6 ($-0.5 < R1/R2 < -0.15$) | −0.319 | −0.293 | −0.316 | −0.306 | −0.294 | −0.284 | −0.260 |
| Formula7 ($0.8 < F/R4 < 1.7$) | 1.457 | 1.533 | 1.417 | 1.394 | 1.204 | 1.102 | 1.018 |

*E: Embodiment

The photographing lenses L of the embodiments may be applied to various imaging or photographing devices such as complementary metal-oxide semiconductor (CMOS) or charge-coupled device (CCD) imaging devices, digital cameras including at least one lens, interchangeable lens cameras, video cameras, surveillance cameras, or mobile communication devices.

Figure 15:
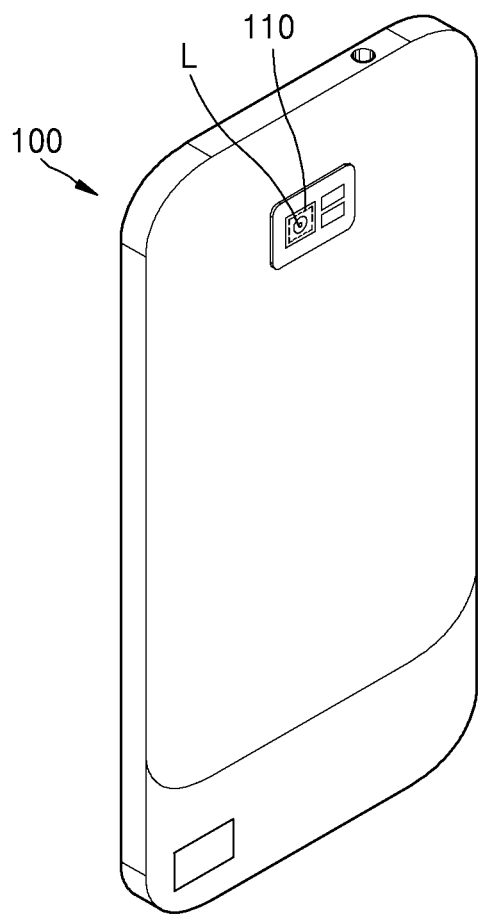
FIG. 15 is a schematic view illustrating a photographing apparatus according to an embodiment of the present disclosure.

FIG. 15 is a view illustrating a photographing apparatus 100 including photographing lenses L according to an embodiment. The apparatus may be, for example, a smartphone having a camera hardware module including an arrangement of lenses as discussed above in any of the embodiments. FIG. 15 illustrates a non-limiting example in which the photographing apparatus 100 is applied to a mobile phone. The mobile phone will include hardware such as a microprocessor, memory, transmitter/receiver for bandwidth in the range used with cellular phones, plus typically other wireless capability such as Bluetooth and NFC. One or more antennas may be arranged within the mobile phone for wireless communication, and the apparatus may include a touchscreen. The photographing apparatus 100 may include the photographing lenses L and an image sensor 110 configured to converting images formed by the photographing lenses L into electrical image signals. The photographing lenses L may be any of the photographing lenses L described with reference to FIGS. 1 to 14. If the photographing lenses L of the embodiments are used in photographing apparatuses such as digital cameras or cameras of mobile devices, the photographing apparatuses may have high photographing performance.

It should be understood that embodiments described herein should be considered in a descriptive sense only and not for purposes of limitation. Descriptions of features or aspects within each embodiment should typically be considered as available for other similar features or aspects in other embodiments.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. §101 and none of the elements are software per se. No claim element herein is to be construed under the provisions of 35 U.S.C. 112, sixth paragraph, unless the element is expressly recited using the phrase "means for".

The definition of the terms "unit" or "module" as referred to herein are to be understood as constituting hardware circuitry such as a CCD, CMOS, SoC, AISC, FPGA, a processor or microprocessor (a controller) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se. For example, the image processor in the present disclosure, and any references to an input unit and/or an output unit both comprise hardware circuitry configured for operation.

While one or more embodiments have been described with reference to the figures, it will be understood by those of ordinary skill in the art that various changes in form and details may be made therein without departing from the spirit and scope as defined by the following claims.

What is claimed is:

1. A plurality of photographing lenses sequentially arranged in a direction from an object side to an image side, comprising:
   a first lens closest to the object side having a positive refractive power and a convex object-side surface;
   a second lens having a negative refractive power and a flat surface facing an object side or an image side;
   a third lens having a predetermined refractive power;
   a fourth lens having a negative refractive power and a meniscus shape concave toward the object side; and a fifth lens furthest from the object side which is concave toward the image side in a region around an optical axis of the photographing lenses, wherein the first lens through the fifth lens are sequentially arranged in a direction from the object side to the image side, and the arrangement of photographing lenses satisfies the following formulas:

$$V1-V2>25$$
$$F4/F<-2 \qquad \text{<Formulas>}$$

wherein V1 denotes an Abbe number of the first lens, V2 denotes an Abbe number of the second lens, F denotes a focal length of the photographing lenses, and F4 denotes a focal length of the fourth lens.

2. The plurality of photographing lenses of claim 1, wherein the sequential arrangement of photographing lenses satisfies the following formula:

$$-3<F2/F1<-1 \qquad \text{<Formula>}$$

wherein F1 denotes a focal length of the first lens, and F2 denotes a focal length of the second lens.

3. The plurality of photographing lenses of claim 1, wherein the arrangement of photographing lenses satisfy the following formula:

$$-2<F2/F<-0.8 \qquad \text{<Formula>}$$

wherein F denotes the focal length of the photographing lenses, and F2 denotes a focal length of the second lens.

4. The plurality of photographing lenses of claim 1, further comprising an aperture stop arranged between the object side and the first lens or between the first lens and the second lens.

5. The plurality of photographing lenses of claim 1, wherein each of the first lens to fifth lens comprises a plastic lens.

6. The plurality of photographing lenses of claim 1, wherein at least one of the first lens to the fifth lens comprises an aspheric lens.

7. The plurality of photographing lenses of claim 1, wherein each of the first lens to fifth lens comprises an aspheric lens.

8. A photographing apparatus comprising:

a plurality of photographing lenses arranged in a direction from an object side to an image side; and an image sensor configured to receive light through the photographing lenses and convert the light into an electric image signal, wherein the plurality of photographing lenses comprise:

a first lens having a positive refractive power and a convex object-side surface;

a second lens having a negative refractive power and a flat surface facing an object side or an image side;

a third lens having a predetermined refractive power;

a fourth lens having a negative refractive power and a meniscus shape concave toward the object side; and a fifth lens which is concave toward the image side in a region around an optical axis of the photographing lenses, wherein the first lens to fifth lens are sequentially arranged in a direction from the object side to the image side, and the photographing lenses satisfy the following formulas:

$$V1-V2>25$$
$$F4/F<-2 \qquad \text{<Formulas>}$$

wherein V1 denotes an Abbe number of the first lens, V2 denotes an Abbe number of the second lens, F denotes a focal length of the photographing lenses, and F4 denotes a focal length of the fourth lens.

* * * * *